Figure 1:
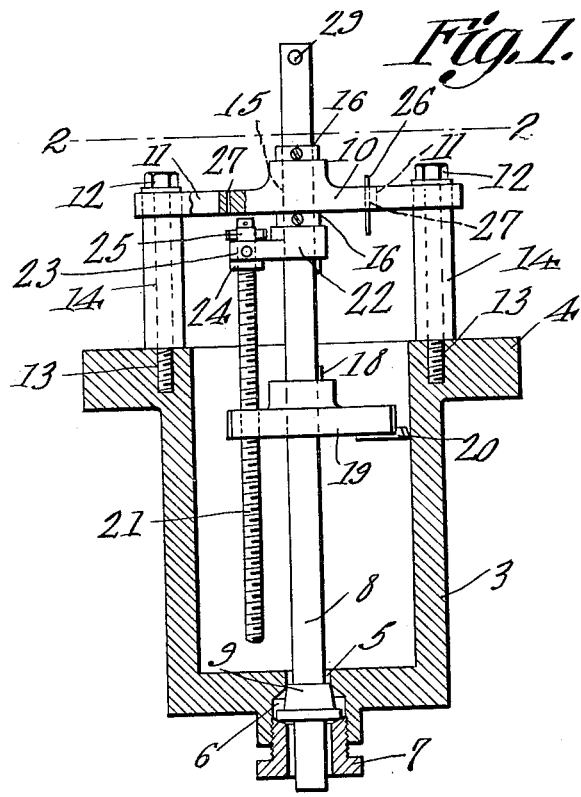

G. W. CUYLER.
BORING BAR.
APPLICATION FILED DEC. 1, 1913.

1,126,715.

Patented Feb. 2, 1915.

G. W. Cuyler, Inventor

Witnesses by C. A. Snow & Co., Attorneys

UNITED STATES PATENT OFFICE.

GEORGE W. CUYLER, OF ESTHERVILLE, IOWA.

BORING-BAR.

1,126,715.  Specification of Letters Patent.  Patented Feb. 2, 1915.

Application filed December 1, 1913. Serial No. 804,043.

*To all whom it may concern:*

Be it known that I, GEORGE W. CUYLER, a citizen of the United States, residing at Estherville, in the county of Emmet and State of Iowa, have invented a new and useful Boring-Bar, of which the following is a specification.

This invention relates to a boring bar and more particularly to a boring bar for cylinders which will fit within and bore an engine or pump cylinder and without requiring that the same be detached from its supporting base.

A further object is to provide a boring tool which is easily or readily attached to an engine or pump cylinder without requiring that the latter be removed from the engine base or supporting structures, and which automatically feeds during the boring process.

A further object is to provide a boring bar or tool which fits within the piston rod stuffing box or gland and the remote end engages the bolt openings which ordinarily secure the head to the cylinder. Thus with the bolts disposed in the diametric openings in the cylinder head and with the remote end passing through the stuffing box, assurance will be had that the boring bar will properly bore and true the surface of the cylinder.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable embodiment of my invention is illustrated, in which:—

Figure 2:
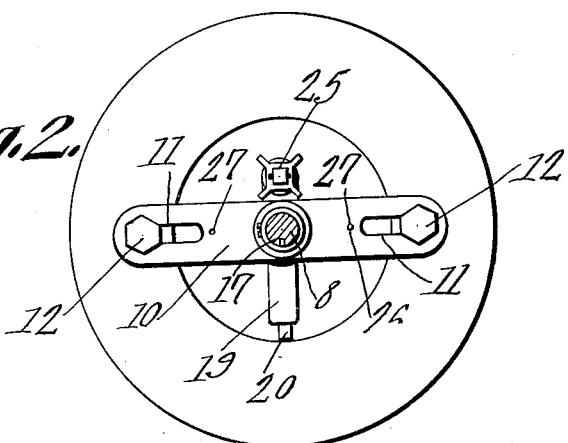

Figure 1 is a view in elevation of my improved boring bar illustrating the same attached to a cylinder, the latter being shown in longitudinal section. Fig. 2 is a cross sectional view thereof taken on the line 2—2 of Fig. 1 in which the boring tool and accessory parts have been revolved through 90 degrees in order to more clearly disclose the construction thereof.

Referring to the drawings in which similar reference numerals designate corresponding parts throughout the several views, 3 is a cylinder which is provided with the usual flange 4 and piston rod opening 5. The opening 5 enlarges to form the stuffing box 6 coacting with which is the stuffing box gland nut 7. The foregoing represents a cylinder of the conventional type such as is used in connection with steam engines, air pumps, or allied machines in which a piston reciprocates.

A bar or axle 8 extends through the opening 5, it being noted that the piston rod, piston head, and cylinder head being first removed. A collar or bearing 9 slidably and rotatably engages the axle 8. The bearing 9 is of such size that it fits within the stuffing box and is held concentric with the side walls thereof by the gland nut 7. Thus when the collar or bearing is disposed within the stuffing box and the gland nut tightened thereagainst, the axle or bar 8 will be disposed concentrically with respect to the side walls of the cylinder. A bracket 10 is rotatably mounted upon the axle 8 and is provided with the slots 11 through which extend the holding bolts 12. The bolts 12 extend down and threadedly engage the openings 13 in the cylinder flange 4 and which openings normally hold the cylinder head to the flange which, however, has been removed prior to the securing of the boring apparatus to the cylinder. A pair of spacers 14 are positioned upon the bolts 12 intermediate the flange 4 and bracket 10 so that the bracket will be held spaced above the cylinder. The slots 11 of the bracket allow the bracket to be properly alined with the cylinder 4 so that the opening 15 which extends through the bracket may be positioned in longitudinal alinement with the axis of the cylinder. The opening 15 rotatably receives the axle 8 therethrough and which is provided with the collars 16 disposed upon opposite sides of the bracket which prevent the longitudinal shifting of the axle. The axle 8 is provided with a spline 17 and which, coacting with the key 18, prevents the tool holder 19 from rotating upon the axle; but at the same time allows the longitudinal shifting thereof. The tool holder 19 thus slidably and rotatably engages the axle 8 and is thus adapted to advance or retract a tool 20 longitudinally of the cylinder and which is rotated by and with the axle 8. The boring tool is held by any suitable means, not shown, in the tool holder so that the tool may be removed to be sharpened or another one replaced therefor.

A feed screw 21 threadedly engages the tool holder 19 and revolves about the axle 8. The feed screw 21 is rotatably held at its upper extremity by the feed screw support 22, the latter being rigidly secured to the axle 8 which passes therethrough. The feed screw extends through an arm 23 of the feed screw support and is held against shifting with respect thereto by the collar 24 and the spoked wheel 25. The spoked wheel 25 in addition to holding the screw 21 against longitudinal shifting also provides means whereby the same may be rotated. A pin 26 extends through an opening 27 in the bracket and is arranged in the path of movement of the spoked wheel 25 in such a manner that when the spoked wheel is revolved about and by the axle 8, the spokes thereof will contact with the pin 26 and will be moved through an arc proportional to the number of spokes in the wheel. Thus the feed screw 21 will be rotated a certain fractional part of a turn during each revolution. The bracket is provided with two equally spaced openings 27 taken with respect to the center and in which the pin 26 may be placed. It is noted that if a pin be placed in each of the openings, the amount the screw is rotated during each revolution will be doubled.

The upper extremity of the axle is provided with the opening 29 extending therethrough and through which a pin may pass to hold a power shaft thereto or by means of which a handle may be secured. Thus the axle may be either manually or power driven and will operate under either condition with equal facility. Also the rate of feed may be controlled by removing or replacing one of the pins 26. The boring bar as thus constructed may be used with cylinders and does not necessitate that the same be removed from the engine bed or supporting structures. The boring tool will adjust itself to cylinders of different diameters and may be easily and quickly alined or centered so that the boring process will be accomplished in a minimum time and with a minimum expense of labor or power.

Having thus fully described my invention, what I claim is:—

A boring mechanism comprising a bracket with a central bearing and with spaced outlying slots, braces disposed beneath the said bracket, bolts extending through said slots, through said braces, and adapted to engage a cylinder to hold the bracket a distance above the extremity thereof, an axle extending through said bracket bearing, a second bearing adapted to be carried at the opposite extremity of said cylinder and rotatably support said axle, means engaging said bracket bearing and axle, to prevent the relative shifting of the latter, a tool holder slidably and non-rotatably mounted upon said shaft, a feed screw support rigidly secured to said axle, a feed screw rotatably and non-translatably secured to said feed screw support and threaded through the said tool holder, a spoked wheel secured to said feed screw above and contacting with the feed screw support and coöperating to hold said feed screw against shifting, said bracket provided with two openings diametrically and symmetrically arranged with respect to the shaft, said openings adapted to detachably receive pins therein, the detachment of said pins allowing the said feed to be accelerated and retarded and providing for varying the periods between advancements of the tool holder.

In testimony that I claim the foregoing as my own, I have hereto affixed my signature in the presence of two witnesses.

GEORGE W. CUYLER.

Witnesses:
H. F. BAUERS,
OTTO BROWN.